July 31, 1951 C. A. DYER 2,562,538
TEMPERATURE MEASURING APPARATUS
Filed Feb. 1, 1947 2 Sheets-Sheet 1

*INVENTOR.*
CLARENCE A. DYER
BY *Arthur H. Swanson*
ATTORNEY.

July 31, 1951          C. A. DYER          2,562,538

TEMPERATURE MEASURING APPARATUS

Filed Feb. 1, 1947          2 Sheets-Sheet 2

*INVENTOR.*
CLARENCE A. DYER

BY *Arthur H. Swinson*

ATTORNEY.

Patented July 31, 1951

2,562,538

UNITED STATES PATENT OFFICE 2,562,538

TEMPERATURE MEASURING APPARATUS

Clarence A. Dyer, Glenside, Pa., assignor, by mesne assignments, to Minneapolis-Honeywell Regulator Company, Minneapolis, Minn., a corporation of Delaware Application February 1, 1947, Serial No. 725,847

2 Claims. (Cl. 73—355)

The present invention relates to pyrometers for use in measuring the temperatures of heat radiating bodies, and in particular, to pyrometers for measuring heat radiated at the relatively low temperatures between 125° F., or lower, and 500° F. The invention relates particularly to radiation pyrometers which are of the type disclosed in the Thomas R. Harrison Patent No. 2,357,193 of August 29, 1944, and which include the improvements in such pyrometers as disclosed and claimed in the application of the said Harrison, Serial No. 658,163, filed March 29, 1946. The type of pyrometer disclosed in said patent is characterized by the mounting of a thermopile, responsive to heat radiation, in a relatively massive housing or body formed of metal of good heat conductivity, such as aluminum, in such manner as to minimize measurement inaccuracies, due to heat radiation from extraneous objects, and to maintain the cold junction or junctions of the thermopile at a temperature which is approximately the same as the temperature of said body.

The prior pyrometer of said Harrison patent included a compensating resistance having a positive temperature coefficient of resistance and connected in shunt to the thermopile. Such compensation, while effective to prevent measuring inaccuracies as a result of variations in the ambient temperature for measurements of temperature of the order of 800° F. or above, is not effective in measuring temperatures substantially lower. Measurement errors due to changes in the ambient temperature are largely eliminated in the improved pyrometer disclosed in said application, Serial No. 658,163, by provisions for supplying heat to the massive metallic body of the pyrometer as required to maintain said body at a predetermined normal temperature. That temperature may be constant in some cases, and in other cases may be equal to and vary with the temperature of the heat radiating body whose temperature is to be measured, as disclosed in said application.

The general object of the present invention is to improve the pyrometers respectively disclosed in said Harrison patent and Harrison application in respect to their mechanical construction, and to provide such pyrometers with special features of construction and arrangement for avoiding errors due to radiation from extraneous objects and for effecting a close regulation of the temperature of the portion of the pyrometer body immediately adjacent and directly controlling the thermopile cold junction temperature.

A specific object of the present invention is to provide a pyrometer of the above-mentioned type with a removable and replaceable thermopile and terminal assembly unit, including a resistance thermometer responsive in a desirable manner to the temperature of the pyrometer body and to the thermopile cold junction temperature, said unit being characterized by its simple and effective construction and its accessibility for inspection and repairs.

Another specific object of the invention is to transmit to the thermopile the heat radiation to be measured through a lens maintained at approximately the same temperature as the pyrometer body, thus avoiding measurement errors due to radiation between the thermopile and the lens which would occur if the latter were at a temperature different from that of said body.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
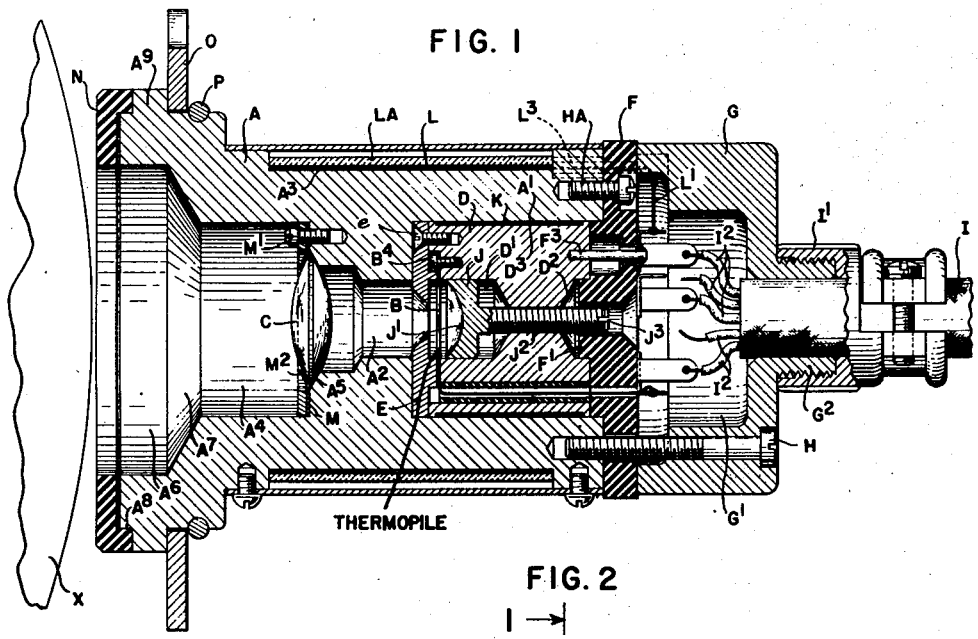
Fig. 1 is a sectional elevation of a pyrometer taken on the line 1—1 of Fig. 2.
Figure 2:
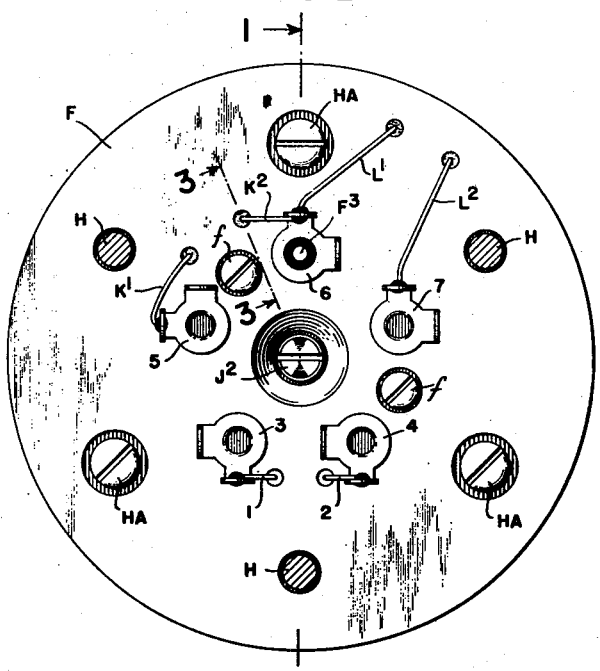
Fig. 2 is an end elevation of the portion of the apparatus shown in section in Fig. 1 at the left of the removable right end cap shown in Fig. 1.

The embodiment of the invention illustrated in the drawings comprises a relatively massive pyrometer housing or chambered structure body A formed of aluminum or other good heat conducting metal. Mounted in the body A is a thermopile B and a suitable lens C for transmitting heat rays to the thermopile from a heat radiating body X, the temperature of which is to be measured. As shown, the thermopile B is supported in and forms a part of an assembly unit comprising a cylindrical body element D, an annular thermopile-retaining element E secured by screws $e$ to the front end of the body D, and a terminal disc F secured by screws $f$, as shown in Fig. 2, to the rear end of the body D. The elements D and E are formed of aluminum or other good heat conducting metal, and the disc F is formed of an insulating material such as a Bakelite-impregnated fabric. The members D, E and F form a thermopile housing and terminal unit adapted for insertion in and removal from a cylindrical chamber A' extending into the body A from its rear end and coaxial with the lens C. The chamber space A' is larger in diameter than the chamber space $A^2$ which extends between the space A' and the lens C.

Terminals 3, 4, 5, 6, and 7, for connecting conductors which are at the opposite sides of the disc F, are mounted on the latter and extend into a space G' formed in a cap-shaped cover or end member G. The latter is detachably secured to the rear end of the body A by bolts H. The latter extend through the cap member G and through registering openings in the marginal portion of the disc F, and are screwed into threaded sockets formed in the body A. The disc F, carrying the member D, is separately secured to the body A by bolts or screws HA. The end member G is formed with an axial passage surrounded by an externally threaded tubular boss $G^2$ which is engaged by a cable clamp I' for anchoring in place the body of a cable I extending into the space G' within the cap G.

Figure 4:
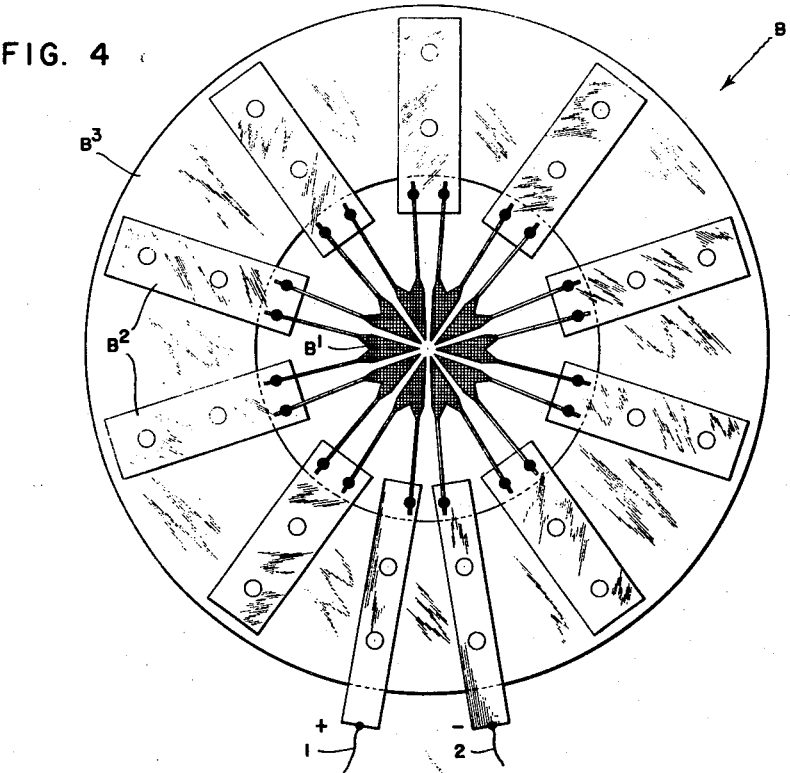
Fig. 4 is an elevation of the thermopile element.

As shown in Fig. 4, the thermopile B comprises ten V-shaped thermocouples B' having their apices spaced around and in close proximity to the pyrometer axis. The two outer leg portions of each thermocouple are in the form of relatively short wires, each of which is connected to a different one of eleven metallic strips $B^2$. The latter are spaced radially at regular intervals around the pyrometer axis and may be formed of constantan and fastened to a mica sheet $B^3$ of annular form which constitutes a supporting part of the thermopile assembly. The strips $B^2$ may be secured to the mica sheet $B^3$ by flattened over extrusions formed in the strips $B^2$ and extending through suitable openings in the mica sheet $B^3$. The apex portions of the different thermocouples B' are flattened and collectively form the hot junction or radiant heat receiving portion of the thermopile. The flattened hot junction portions of the thermocouples are blackened with aquadag and smoked or coated with lamp black to provide a surface which will readily absorb substantially all of the incident radiation.

The mica sheet $B^3$ and insulation at the opposite sides of said sheet are attached to the member D by screws $B^4$ and are clamped in place between the end of the member D and the retainer E. The latter, as shown, is formed with recesses receiving the heads of the screws $B^4$ and is directly secured to the member D by screws e, as previously explained.

Nine of the metallic strips $B^3$ are each connected to two of the thermocouples B', as shown in Fig. 4. One of the other two strips is connected to a terminal wire 1, and the second of those strips is connected to a terminal wire 2. The ten thermocouples B' are thus connected in series between the wires 1 and 2. These wires extend rearwardly through longitudinal passages, formed in the member D and lined with insulating material, to the rear end of the member D, and thence extend through openings formed in the member F and are respectively attached to the previously mentioned terminals 3 and 4 mounted on the disc F. The appropriate terminal elements $I^2$ of the cable I are also connected to the terminals 3 and 4.

The member D is formed with an axial cylindrical recess D' in its front end portion which receives a mirror formed by the polished concave front end surface J' of a mirror body J. The latter may be formed of stainless steel, and is movably received in the recess D'. As shown, the mirror body is provided at its rear side with an axially extending threaded stem or spindle $J^2$, which is threaded in and extends through a threaded axial passage formed in the portion of the member D at the rear of the chamber D'. The rear end of the mirror stem $J^2$ passes loosely through a central aperture in the disc F and is formed at its end with a slot or a kerf $J^3$ adapted for engagement by a screw driver which may be used to rotate the stem $J^2$ and thereby axially adjust the mirror J when the cap member G is removed from the body A. As shown, the member D is formed at its rear end with a shallow central recess $D^2$ to receive a centering, hub-like projection F' which is formed on the front side of the member F.

Figure 3:
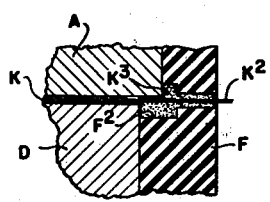
Fig. 3 is a partial section on the line 3—3 of Fig. 2.

The member D is formed with a shallow peripheral groove $D^3$ in which a bifilar wound coil K of resistance thermometer wire is placed. The ends K' and $K^2$ of the wire forming the coil K extend through apertures in the disc F and are connected to terminals 5 and 6 respectively, which in turn are mounted on the rear side of the disc 7. To these terminals are connected corresponding terminal elements $I^2$ of the cable I. The resistance thermometer wire may well be insulated by varnish applied to and baked on the wall of the groove $D^3$ before the wire is wound in the groove, and other varnish may be applied to the wire, after the latter is wound in place, and then baked. As shown in detail in Fig. 3, each f the ends K' and $K^2$ of the resistance thermometer wire is anchored in place in the member F by cement $K^3$ surrounding the wire and filling the passage $F^2$ in the member F through which the wire extends. As shown in Fig. 3, the rear portion of each passage $F^2$ is appreciably larger in diameter than the wire of coil K, and the portion of each passage $F^2$ adjacent the member D is a counter-bored enlargement of the rear portion of the passage.

The pyrometer body A is formed with a peripheral groove $A^3$ in which there is a heating resistance coil L which may be formed and insulated generally as is the coil K. The radial depth of the groove $A^3$ is substantially greater than the radial thickness of the coil L, and the latter is surrounded by a heat insulating layer LA, which may consist of asbestos covering material secured in place by asbestos cord. The end portions L' and $L^2$ of the heating coil wire pass through corresponding longitudinally extending passages $L^3$ in the portion of the body A at the rear of the groove $A^3$, and are surrounded by insulation which may be in the form of Bakelite tube sections and may be cemented in place in the passages $L^3$. The end portion L' of the heating coil wire is connected to the previously mentioned terminal 6 to which the end $K^2$ of the resistance thermometer wire is attached, and the end $L^2$ of the heating coil is connected to the terminal 7.

The terminal 6 is electrically connected to the pyrometer housing by a pin $F^3$ which is connected to the terminal 6 and which fits into a corresponding hole in the member D. This connection permits suitable electrical grounding of the apparatus through the cable I.

The member A is formed with a chamber or space in front of the lens C. That space comprises a cylindrical lens chamber A⁴ substantially larger in diameter than the adjacent end of the chamber A². An annular shoulder A⁵ connects the peripheral walls of the spaces A² and A⁴, and is beveled adjacent its inner edge to provide a seat for the lens C. The latter is anchored in place by an annular metallic lens retainer ring M having its body portion clamped against the shoulder A⁵ by screws M'. The retainer ring M is provided at its inner edge with inclined projections M² which bear against the outer portion of the front surface of the lens C. The chamber A⁴ merges at its outer end into a cylindrical chamber portion A⁶, the latter having the inner end of its peripheral wall connected to the outer end of the peripheral wall of the chamber A⁴ by a conical radiation-reflecting wall A⁷.

Advantageously and as shown, an annular cap member N is attached to the front end of the body A, being formed of suitable non-metallic, heat insulating material which may well be a fabric impregnated with black Bakelite. As shown, the end member N is provided at its rear side with a cylindrical flange portion received in a peripheral recess or rabbeted seat A⁸ formed in the member A in front of its peripheral flange portion A⁹. The rear side of the flange A⁹ abuts against a pyrometer supporting plate or flange O which is formed with an aperture through which the portion of the member A at the rear of flange A⁹ extends. As shown, the member A may be removably locked in place in the support O by a split locking ring P received in a peripheral groove formed in the portion of the member A immediately back of the support O.

The pyrometer construction shown provides especially advantageous thermal conditions and relations. The lens C is in direct engagement with the thick intermediate portion of the body A which surrounds the chamber A². A substantial portion of the heating coil L is in front of the plane of the lens C, and a substantial portion of the coil is at the rear of the plane of the thermopile B. The lens C and the cold junction portion of the thermopile B are thus each located in a portion of the pyrometer which is at a temperature subject to accurate control by the regulation of the current flow in the heating coil L. The mounting for the lens C may thus be maintained at substantially the regulated temperature of the body, as is practically desirable. Unregulated variations in the temperature of the lens C result in measuring inaccuracies, since heat flow between the lens and the thermopile takes place when the lens and the thermopile are at different temperatures. The lens C should be formed of a material such as sodium chloride, potassium bromide, or calcium fluoride, which materials are adapted to pass a relatively large amount of the heat rays radiated by the low temperature of the body whose radiation is being measured.

The resistance thermometer coil K surrounds the peripheral portion of the thermopile housing D, and in effect lines the peripheral wall of the chamber A' for substantially the full length of the member D. Also, the coil K is overlapped by the coil L for nearly half the length of the latter. The coil K is thus adapted to respond quickly and accurately to changes in the average temperature of a large portion of the body A and in the thermopile cold junction temperature.

The ease with which the thermopile assembly may be removed for inspection and for repairs and minor adjustments, when necessary or desirable, is plainly apparent. The parts of the assembly which need to fit closely together are relatively simple in shape and easily machined. The form of the one piece housing or body A and the insulating cap member N on its front end permits the pyrometer to be disposed in close proximity to the body X whose temperature is to be measured, without risk of injurious contact of the pyrometer body A with the body X, or of excessive local heating of the body A. At the same time, the arrangement, including the reflecting surface A⁷, permits the area of the surface of the body X effectively radiating heat to the lens C to be relatively large. The cap N may be so close to the body X that the opportunity for the passage of heat rays from extraneous objects to the lens C through the space between the body X and the cap member N is negligible.

The body X, which is the object whose temperature is to be measured, is shown by way of example as being a heated roll or drum, such as a steam heated drying roll. As will be understood, however, the pyrometer disclosed herein is well adapted to measure the temperatures of many other bodies or objects, which may be either stationary or movable.

As previously noted, it is desirable to maintain the pyrometer body A at a regulated temperature. This may be a constant temperature in some cases, while in other cases the temperature of the body A is advantageously maintained at the temperature of the body X whose temperature is to be measured. Measurement errors due to variations in ambient temperature may be avoided with either mode of regulating the temperature of the pyrometer body. Automatic control arrangements for effecting both kinds of regulation of a pyrometer body temperature are disclosed in said Harrison application, Serial No. 658,163, and may be readily adapted for use in regulating the temperature of the pyrometer body A by varying the current flow in the heater resistance L in automatic response to variations in the temperature of the resistance thermometer element K. As those skilled in the art will understand, the resistance of the element K varies in a predetermined manner as its temperature is changed.

Figure 5:
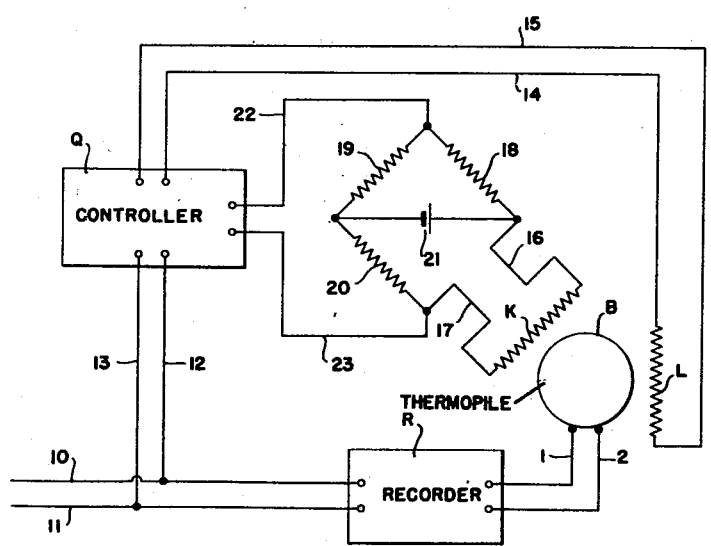
Fig. 5 is a diagram illustrating an automatic system for regulating the temperature of the pyrometer body.

One such arrangement is illustrated by way of example in Fig. 5, wherein electric current, which may be either direct current or alternating current, is supplied by the conductors 10 and 11. These conductors may be branches of an ordinary electric distribution system, and the current supplied is used in energizing the heating resistor L and in energizing instruments Q and R. The instrument Q is a controller which may be either a self-balancing potentiometer controller or a millivolt controller of conventional type, and receives current from the supply conductors 10 and 11 through branch conductors 12 and 13. The controller Q passes current received from the supply conductors 10 and 11 to the terminals of the heating resistor L at a suitable regulated rate through conductors 14 and 15 extending from the controller.

To enable the controller Q to vary the supply of current to the heating resistor L in selective accordance with variations in the temperature of the resistance thermometer K, the latter must be suitably associated with the instrument. In the particular arrangement shown by way of example, the resistance K has its terminals connected by conductors 16 and 17 to a resistance bridge of which the resistor K forms one arm and resistances 18, 19, and 20 form the other three arms. An energizing source of current, shown as a battery 21, is connected between an opposed pair of junction points of the resistance bridge, and the other two opposed junction points of the bridge are connected by conductors 22 and 23 to the measuring circuit of the controller Q. The terminals 1 and 2 of the thermopile B are connected in the measuring circuit of the instrument R, which may well be a recording potentiometer or a recording millivoltmeter of conventional type.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a radiation pyrometer, the combination with a relatively massive pyrometer body of metal having good heat conductivity and formed with a central passage open at the front end of said body to receive heat radiation to be measured and having a cylindrical space adjacent the rear end of said body, of a thermopile assembly seated in said space and comprising a cylindrical metallic element, a thermopile supported by said element at its front end and having a central hot junction portion to receive heat radiation entering the front end of said passage and having a cold junction portion adjacent the periphery of said element, means for measuring the temperature of the portion of said body adjacent said element comprising an elongated temperature responsive means surrounding said element for a major portion of the length of the latter, a lens mounted in said body and extending across said passage between said thermopile and the front end of said body, said lens having its peripheral portion in good heat transfer relation with said body, an elongated heating coil surrounding a correspondingly elongated portion of said body and having its rear end closer than said thermopile to the rear end of said body, overlapping a major portion of said temperature responsive means, and having its front end closer than said lens to the front end of said body, and control means responsive to variations in the temperature to which said temperature responsive means is responsive and operative to vary the heating action of said heating coil in response to said variations.

2. Apparatus as specified in claim 1, wherein said temperature responsive means comprises a resistance thermometer coil, and wherein said control means is responsive to variations in the resistance of said resistance thermometer coil.

CLARENCE A. DYER.

REFERENCES CITED

The following references are of record in the file of this patent:

UNITED STATES PATENTS

| Number | Name | Date |
|---|---|---|
| 1,617,416 | Pierce | Feb. 15, 1927 |
| 1,901,192 | Reinhardt et al. | Mar. 14, 1933 |
| 2,025,534 | Sheard et al. | Dec. 24, 1935 |
| 2,138,593 | Breitenstein | Nov. 29, 1938 |
| 2,357,193 | Harrison | Aug. 29, 1944 |
| 2,407,678 | Ohl | Sept. 17, 1946 |

OTHER REFERENCES

Article, Radiation Pyrometry in Turbosupercharger Testing by Victor P. Head, published in "Instruments," vol. 17, p. 36, Jan. 1944. (Copy in Sci. Lib.)

Houghten et al.: Am. Soc. Heating and Ventilating Engrs., vol. 33 (1932), pp. 239, 240. (Copy in Sc. Libr.)

Doyle et al.: J. Iron and Steel Inst., vol. 144 (1941), pages 214P, 215P. (Copy in Div. 3.)